(12) United States Patent
Kumar et al.

(10) Patent No.: US 10,330,485 B2
(45) Date of Patent: Jun. 25, 2019

(54) ENHANCED NAVIGATION WITH CROWD-SOURCED INFORMATION

(71) Applicant: QUALCOMM Incorporated, San Diego, CA (US)

(72) Inventors: Akash Kumar, Hyderabad (IN); Ankit Maheshwari, Hyderabad (IN); Atul Soni, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 15/488,467

(22) Filed: Apr. 15, 2017

(65) Prior Publication Data

US 2018/0299280 A1   Oct. 18, 2018

(51) Int. Cl.
*H04W 4/02* (2018.01)
*G01C 21/34* (2006.01)
*G01C 21/36* (2006.01)

(52) U.S. Cl.
CPC ..... *G01C 21/3484* (2013.01); *G01C 21/3492* (2013.01); *G01C 21/3676* (2013.01); *G01C 21/3697* (2013.01); *H04W 4/02* (2013.01); *G01C 21/3694* (2013.01)

(58) Field of Classification Search
None
See application file for complete search history.

(56) References Cited

U.S. PATENT DOCUMENTS

| | | | |
|---|---|---|---|
| 8,311,741 B1 * | 11/2012 | Lawther | H04W 4/02 701/527 |
| 9,058,324 B2 | 6/2015 | Kohlenberg et al. | |
| 9,175,967 B2 | 11/2015 | Abramson et al. | |
| 2007/0078597 A1 * | 4/2007 | Kotzin | G01C 21/3453 701/433 |
| 2008/0009324 A1 * | 1/2008 | Patel | H04W 48/18 455/566 |
| 2010/0036604 A1 * | 2/2010 | O'Connell | G01C 21/3461 701/533 |
| 2010/0088025 A1 * | 4/2010 | Garg | G01C 21/3461 701/533 |
| 2013/0024107 A1 * | 1/2013 | Xie | G01C 21/3461 701/423 |
| 2014/0067257 A1 * | 3/2014 | Dave | G01C 21/3461 701/423 |
| 2014/0105003 A1 | 4/2014 | Austin et al. | |
| 2016/0282129 A1 | 9/2016 | Wang et al. | |
| 2016/0364823 A1 | 12/2016 | Cao | |

* cited by examiner

*Primary Examiner* — Rami Khatib

(74) *Attorney, Agent, or Firm* — Muncy, Geissler, Olds & Lowe, P.C.

(57) ABSTRACT

Disclosed are systems and methods for navigating a mobile device based on network connectivity. An aspect includes calculating one or more routes from an origin location to a destination location based on first network connectivity information for a first subscription of a plurality of subscriptions of the mobile device and second network connectivity information for a second subscription of the plurality of subscriptions, providing the one or more routes and an indication of available network connectivity along each portion of the one or more routes based on the first and second network connectivity information, receiving a selection of one of the one or more routes, and setting, based on the first network connectivity information, the first subscription as an active subscription for the mobile device for a first portion of the selected route.

30 Claims, 8 Drawing Sheets

ENHANCED NAVIGATION WITH CROWD-SOURCED INFORMATION

FIELD OF DISCLOSURE

The disclosure relates generally to location-based services, and more specifically to enhanced navigation with crowd-sourced information.

BACKGROUND

Mobile communications networks are in the process of offering increasingly sophisticated capabilities associated with the position sensing of a mobile device. New software applications, such as those related to navigation, personal productivity, collaborative communications, social networking, data acquisition, etc., may utilize the position of the mobile device to provide new features and services to consumers. Such position determination capabilities may be provided using digital cellular positioning techniques and/or Satellite Positioning Systems (SPS).

In conventional digital cellular networks, position capability can be provided by various time and/or phase measurement techniques. For example, in Code Division Multiple Access (CDMA) networks, such as Long Term Evolution (LTE), one position determination approach used is Advanced Forward Link Trilateration (AFLT). Using AFLT, a mobile device may compute its position from phase measurements of pilot signals transmitted from a plurality of base stations. Improvements to AFLT have been realized by utilizing hybrid position techniques, where the mobile device may employ an SPS receiver that can provide position information independent of the information derived from the signals transmitted by the base stations. Moreover, position accuracy can be improved by combining measurements derived from both SPS and AFLT systems using conventional techniques.

Furthermore, navigation devices often support popular SPS wireless technologies that may include, for example, the Global Positioning System (GPS) and/or a Global Navigation Satellite System (GNSS). Navigation devices supporting SPS may obtain navigation signals as wireless transmissions received from one or more transmitter equipped satellites that may be used to estimate geographic position and heading. Some navigation devices may additionally or alternatively obtain navigation signals as wireless transmissions received from terrestrial based transmitters to estimate geographic position and heading.

Certain mobile devices, such as smartphones, tablet computers, and in-vehicle "infotainment" devices, typically include applications for navigation, driving directions, and/or pathfinding. These applications may use SPS or other techniques to determine the mobile device's position. Driving directions and other routes may be determined by the mobile device or by a server device in communication with the mobile device. Directions are typically generated for the route having the shortest distance or travel time between two points.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for navigating a mobile device based on network connectivity includes calculating one or more routes from an origin location to a destination location based on first network connectivity information for a first subscription of a plurality of subscriptions of the mobile device and second network connectivity information for a second subscription of the plurality of subscriptions, providing the one or more routes and an indication of available network connectivity along each portion of the one or more routes based on the first and second network connectivity information, receiving a selection of one of the one or more routes, and setting, based on the first network connectivity information, the first subscription as an active subscription for the mobile device for a first portion of the selected route.

In an aspect, an apparatus for navigating a mobile device based on network connectivity at least one processor configured to calculate one or more routes from an origin location to a destination location based on first network connectivity information for a first subscription of a plurality of subscriptions of the mobile device and second network connectivity information for a second subscription of the plurality of subscriptions, provide the one or more routes and an indication of available network connectivity along each portion of the one or more routes based on the first and second network connectivity information, receive a selection of one of the one or more routes, and set, based on the first network connectivity information, the first subscription as an active subscription for the mobile device for a first portion of the selected route.

In an apparatus for navigating a mobile device based on network connectivity includes a processing means configured to calculate one or more routes from an origin location to a destination location based on first network connectivity information for a first subscription of a plurality of subscriptions of the mobile device and second network connectivity information for a second subscription of the plurality of subscriptions, provide the one or more routes and an indication of available network connectivity along each portion of the one or more routes based on the first and second network connectivity information, receive a selection of one of the one or more routes, and set, based on the first network connectivity information, the first subscription as an active subscription for the mobile device for a first portion of the selected route.

In an aspect, a non-transitory computer-readable medium storing computer-executable instructions for navigating a mobile device based on network connectivity includes computer-executable instructions comprising at least one instruction to calculate one or more routes from an origin location to a destination location based on first network connectivity information for a first subscription of a plurality of subscriptions of the mobile device and second network connectivity information for a second subscription of the plurality of subscriptions, at least one instruction to provide the one or more routes and an indication of available network connectivity along each portion of the one or more routes based on the first and second network connectivity information, at least one instruction to receive a selection of one of the one or more routes, and at least one instruction to set, based on the first network connectivity information, the first subscription as an active subscription for the mobile device for a first portion of the selected route.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
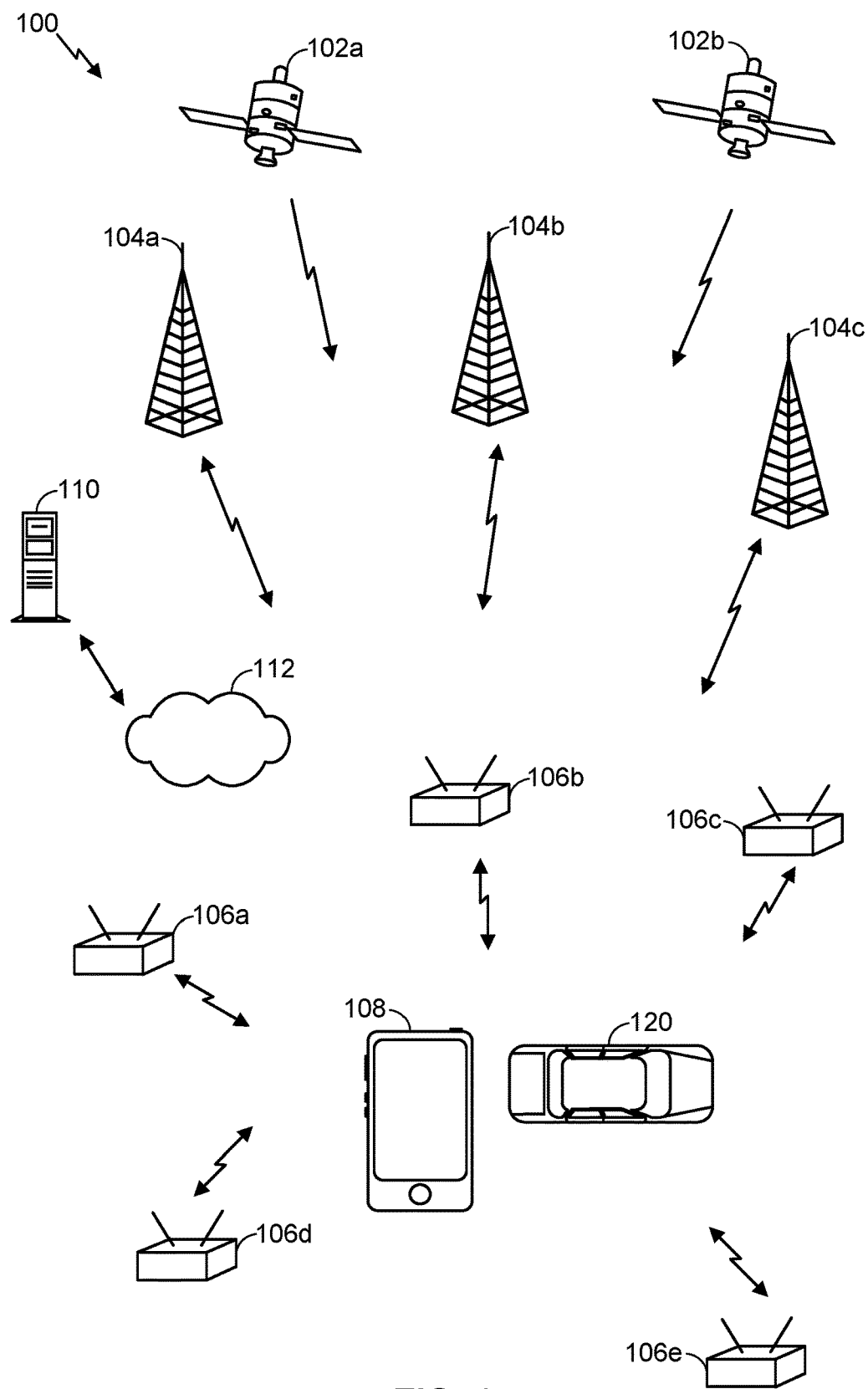
FIG. 1 illustrates an exemplary operating environment for a mobile device that can determine position using wireless techniques, according to at least one aspect of the disclosure.

Disclosed are systems and methods for navigating a mobile device based on network connectivity. An aspect includes calculating one or more routes from an origin location to a destination location based on first network connectivity information for a first subscription of a plurality of subscriptions of the mobile device and second network connectivity information for a second subscription of the plurality of subscriptions, providing the one or more routes and an indication of available network connectivity along each portion of the one or more routes based on the first and second network connectivity information, receiving a selection of one of the one or more routes, and setting, based on the first network connectivity information, the first subscription as an active subscription for the mobile device for a first portion of the selected route.

These and other aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular aspects only and not to limit any aspects disclosed herein. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

According to one aspect of the disclosure, FIG. 1 illustrates an exemplary operating environment 100 for a mobile device 108 having wireless positioning capability. The operating environment 100 may contain one or more different types of wireless communication systems and/or wireless positioning systems. In the aspect shown in FIG. 1, one or more Satellite Positioning System (SPS) satellites 102a, 102b may be used as an independent source of position information for the mobile device 108. The mobile device 108 may include one or more dedicated SPS receivers specifically designed to receive signals for deriving geoposition information from the SPS satellites.

The operating environment 100 may also include one or more Wide Area Network Wireless Access Points (WAN-WAPs) 104a, 104b, 104c (collectively WAN-WAP(s) 104), which may be used for wireless voice and/or data communication, and as another source of independent position information for the mobile device 108. The WAN-WAPs 104a-104c may be part of a wide area wireless network (WWAN), which may include cellular base stations at known locations, and/or other wide area wireless systems, such as, for example, Worldwide Interoperability for Microwave Access (WiMAX) (e.g., IEEE 802.16). The WWAN may include other known network components that are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106a, 106b, 106c, 106d, 106e (collectively LAN-WAP(s) 106), which may be used for wireless voice and/or data communication, as well as another independent source of position data. The LAN-WAPs 106 can be part of a Wireless Local Area Network (WLAN), which may operate in buildings and perform communications over smaller geographic regions than a WWAN. Such LAN-WAPs 106a-106e may be part of, for example, Wi-Fi networks (802.11x), cellular piconets and/or femtocells, Bluetooth® networks, etc.

The mobile device 108 may derive position information from any one or more of the SPS satellites 102a, 102b, the WAN-WAPs 104a-104c, and/or the LAN-WAPs 106a-106e. Each of the aforementioned systems can provide an independent estimate of the position for the mobile device 108 using different techniques. In some aspects, the mobile device 108 may combine the solutions derived from each of the different types of access points to improve the accuracy of the position data. When deriving position using the SPS satellites 102a, 102b, the mobile device 108 may utilize a receiver specifically designed for use with the SPS that extracts position, using conventional techniques, from a plurality of signals transmitted by SPS satellites 102a, 102b.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipments, and/or space vehicles. In a particular example, such transmitters may be located on Earth orbiting satellite vehicles (SVs). For example, a SV in a constellation of Global Navigation Satellite System (GNSS), such as Global Positioning System (GPS), Galileo, Glonass, or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, for example, Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed methods and apparatuses may be used with positioning determination systems that utilize pseudolites or a combination of satellites and pseudolites. Pseudolites are ground-based transmitters that broadcast a PN code or other ranging code (similar to a GPS or Code Division Multiple Access (CDMA) cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite," as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the mobile device 108 may include a cellular transceiver and processor that can exploit the base station signals to derive position. Such cellular networks may include, but are not limited to, standards in accordance with Global System for Mobile communications (GSM), CDMA, 2G, 3G, 4G, Long-Term Evolution (LTE), etc. It should be understood that digital cellular network may include additional base stations or other resources that may not be shown in FIG. 1. While WAN-WAPs 104a-104c may actually be moveable or otherwise capable of being relocated, for illustration purposes it will be assumed that they are essentially arranged in a fixed position.

The mobile device 108 may perform position determination using known time-of-arrival (TOA) techniques, such as Advanced Forward Link Trilateration (AFLT). The mobile device 108 may determine its position using TOA techniques from signals provided by the WAN-WAPs 104a-104c. The mobile device 108 may determine positions either in a stand-alone mode, or using the assistance of a positioning server 110 and network 112 using TOA techniques. Furthermore, various aspects may have the mobile device 108 determine position information using WAN-WAPs 104a-104c, which may have different types. For example, some WAN-WAPs 104a-104c may be cellular base stations, and other WAN-WAPs 104a-104c may be WiMAX base stations. In such an operating environment, the mobile device 108 may be able to exploit the signals from each different type of WAN-WAP 104a-104c, and further combine the derived position solutions to improve accuracy.

When deriving position using the WLAN, the mobile device 108 may utilize TOA techniques with the assistance of the positioning server 110 and the network 112. The positioning server 110 may communicate with the mobile device 108 through network 112. Network 112 may include a combination of wired and wireless networks that incorporate the LAN-WAPs 106a-106e. In one aspect, each LAN-WAP 106a-106e may be, for example, a Wi-Fi wireless access point, which is not necessarily set in a fixed position and can change position. The position of each LAN-WAP 106a-106e may be stored in the positioning server 110 in a common coordinate system. In one aspect, the position of the mobile device 108 may be determined by having the mobile device 108 receive signals from one or more LAN-WAPs 106a-106e. Each signal may be associated with its originating LAN-WAP based upon some form of identifying information that may be included in the received signal (such as, for example, a MAC address). The mobile device 108 may then sort the received signals based upon signal strength, and derive the time delays associated with each of the sorted received signals. The mobile device 108 may then form a message which can include the time delays and the identifying information of each of the LAN-WAPs, and send the message via network 112 to the positioning sever 110. Based upon the received message, the positioning server 110 may then determine a position, using the stored locations of the relevant LAN-WAPs 106a-106e, of the mobile device 108. The positioning server 110 may generate and provide a Location Configuration Indication (LCI) message to the mobile device 108 that includes a pointer to the position of the mobile device 108 in a local coordinate system. The LCI message may also include other points of interest in relation to the position of the mobile device 108. When computing the position of the mobile device 108, the positioning server 110 may take into account the different delays which can be introduced by elements within the wireless network.

As used herein, the term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on. cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

In an aspect, the mobile device 108 may be a navigation device installed in a vehicle 120. The mobile device 108 may use the odometer value read from the vehicle 120 (e.g., a cumulative odometer value stored on the vehicle 120 via electronic, mechanical, or other means) to determine changes in distance and reveal the total distance traveled in the vehicle 120, which may be used to quickly initialize various parameters that may be used to derive an estimated initial position, velocity, and heading that can be used to support navigation in the vehicle 120. The mobile device 108 may be configured with a user interface to provide a driver of the vehicle 120 with turn-by-turn directions from an origin location to a destination location. As will be described further herein, the mobile device 108 may provide additional information about a route between the origin and destination locations.

Figure 2:
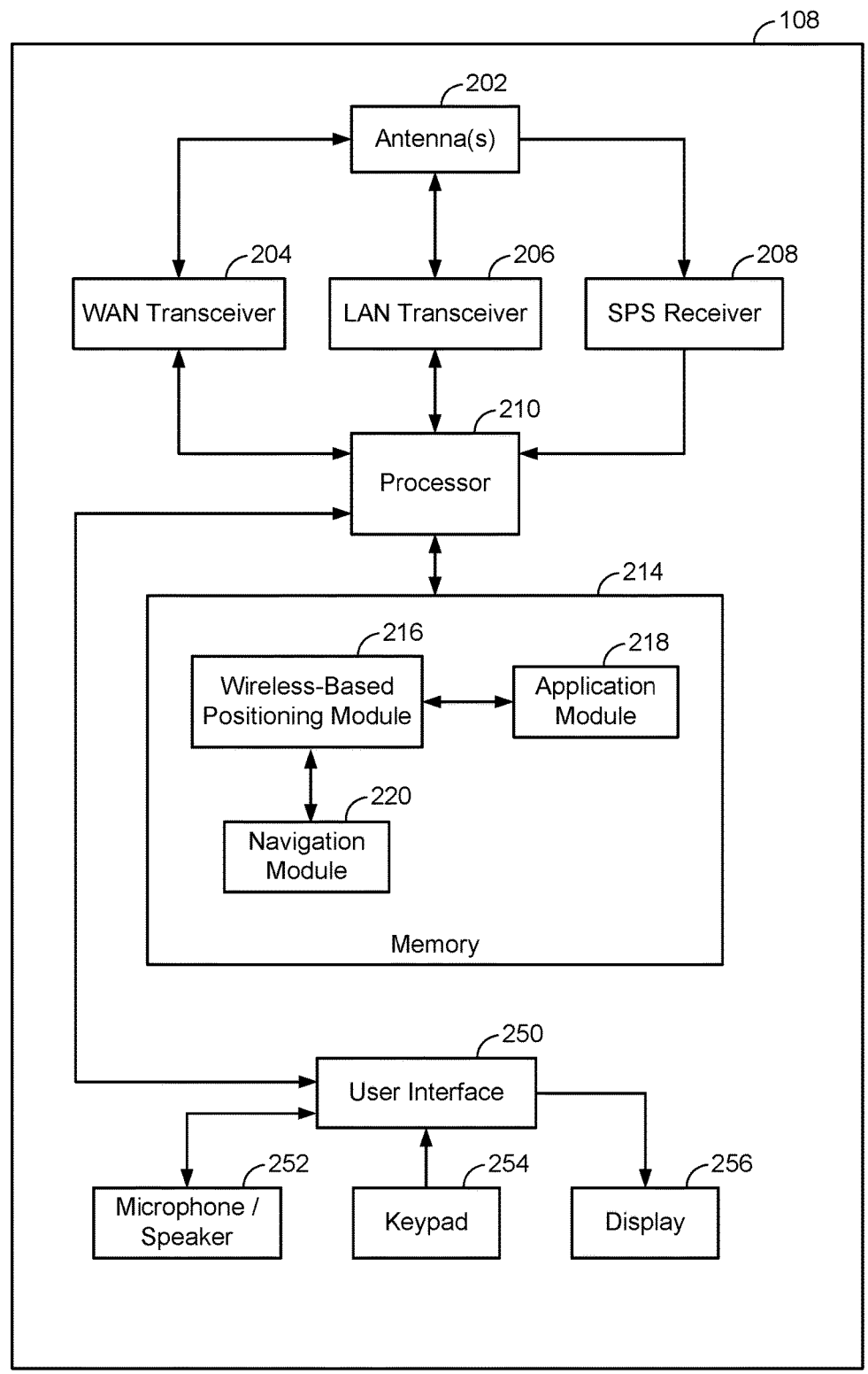
FIG. 2 illustrates an exemplary mobile device that may be used in an operating environment that can determine position using wireless techniques, according to at least one aspect of the disclosure.

FIG. 2 is a block diagram illustrating various components of the exemplary mobile device 108. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile device 108 may include one or more wide area network (WAN) transceiver(s) 204 that may be connected to one or more antennas 202. The WAN transceiver(s) 204 comprise suitable devices, hardware, and/or software for communicating with and/or detecting signals to/from WAN-WAPs 104a-104c, and/or directly with other wireless devices within a network. In one aspect, the WAN transceiver(s) 204 may comprise a CDMA communication system suitable for communicating with a CDMA network of wireless base stations; however, in other aspects, the wireless communication system may comprise another type of cellular telephony network, such as, for example, TDMA or GSM. Additionally, any other type of wide area wireless networking technologies may be used, for example, WiMAX (IEEE 802.16), etc.

The mobile device 108 may also include one or more local area network (LAN) transceivers 206 that may be connected to the one or more antennas 202. The LAN transceiver(s) 206 comprise suitable devices, hardware, and/or software for communicating with and/or detecting signals to/from LAN-WAPs 106a-106e, and/or directly with other wireless devices within a network. In one aspect, the LAN transceiver 206 may comprise a Wi-Fi (802.11x) communication system suitable for communicating with one or more wireless access points; however, in other aspects, the LAN transceiver 206 comprise another type of local area network, personal area network, (e.g., Bluetooth®). Additionally, any other type of wireless networking technologies may be used, for example, Ultra Wide Band, ZigBee®, wireless Universal Serial Bus (USB), etc.

As used herein, the abbreviated term "wireless access point" (WAP) may be used to refer to LAN-WAPs 106a-106e and/or WAN-WAPs 104a-104c. Specifically, in the description presented below, when the term "WAP" is used, it should be understood that aspects may include a mobile device 108 that can exploit signals from a plurality of LAN-WAPs 106a-106e, a plurality of WAN-WAPs 104a-104c, or any combination of the two. The specific type of WAP being utilized by the mobile device 108 may depend upon the environment of operation. Moreover, the mobile device 108 may dynamically select between the various types of WAPs in order to arrive at an accurate position solution. In other aspects, various network elements may operate in a peer-to-peer manner, whereby, for example, the mobile device 108 may be replaced with the WAP, or vice versa. Other peer-to-peer aspects may include another mobile device (not shown) acting in place of one or more WAP.

An SPS receiver 208 may also be included in the mobile device 108. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile device's 108 position using measurements obtained by any suitable SPS algorithm.

A processor 210 may be connected to the WAN transceiver 204, LAN transceiver 206, and the SPS receiver 208. The processor 210 may include one or more microprocessors, microcontrollers, and/or digital signal processors that provide processing functions, as well as other calculation and control functionality. The processor 210 may also include memory 214 for storing data and software instructions for executing programmed functionality within the mobile device 108. The memory 214 may be on-board the processor 210 (e.g., within the same integrated circuit (IC) package), and/or the memory 214 may be external memory to the processor 210 and functionally coupled over a data bus.

A number of software modules and data tables may reside in memory 214 and be utilized by the processor 210 in order to manage both communications and positioning determination functionality as discussed herein. As illustrated in FIG. 2, memory 214 may include and/or otherwise receive a wireless-based positioning module 216, an application module 218, and a navigation module 220. One should appreciate that the organization of the memory contents as shown in FIG. 2 is merely exemplary, and as such the functionality of the modules and/or data structures may be combined, separated, and/or be structured in different ways depending upon the implementation of the mobile device 108.

The application module 218 may be a process running on the processor 210 of the mobile device 108 that requests position information from the wireless-based positioning module 216. Applications typically run within an upper layer of the software architectures, and may include, for example, a Buddy Locator, a Shopping and Coupons application, an Asset Tracking application, a Location Aware Service Discovery application, and the like. The wireless-based positioning module 216 may derive the position of the mobile device 108 using information derived from time information measured from signals received from a plurality of WAPs and/or from other sources, such as from SPS measurements. As will be described further herein, the navigation module 220 may obtain or determine navigation information to display to a user of the mobile device 108 based on information from the wireless-based positioning module 216 and/or the positioning server 110.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216 and/or the application module 218 may be provided in firmware. Additionally, while in this example the wireless-based positioning module 216 and the application module 218 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 214 to selectively initiate one or more routines for performing enhanced navigation operations, as described herein.

The mobile device 108 may include a user interface 250 that provides any suitable interface systems, such as a microphone/speaker 252, keypad 254, and display 256 that allows user interaction with the mobile device 108. The microphone/speaker 252 provides for voice communication services using the WAN transceiver 204 and/or the LAN transceiver 206. The keypad 254 comprises any suitable buttons for user input. The display 256 comprises any suitable display, such as a backlit liquid crystal display (LCD), and may further include a touch screen display for additional user input modes.

As used herein, the mobile device 108 may be any portable or movable device or machine that is configurable to acquire wireless signals transmitted from, and transmit wireless signals to, one or more wireless communication devices or networks. As shown in FIG. 1 and FIG. 2, the mobile device 108 is representative of such a portable wireless device. Thus, by way of example but not limitation, the mobile device 108 may include a radio device, a cellular telephone device, a computing device, a personal communication system (PCS) device, or other like movable wireless communication equipped device, appliance, or machine. The term "mobile device" is also intended to include devices which communicate with a personal navigation device (PND), such as by short-range wireless, infrared, wire line connection, or other connection, regardless of whether satellite signal reception, assistance data reception, and/or position-related processing occurs at the device or at the PND. Also, the term "mobile device" is intended to include all devices, including wireless devices, computers, laptops, etc. that are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

As used herein, the term "wireless device" may refer to any type of wireless communication device that may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

Figure 3:
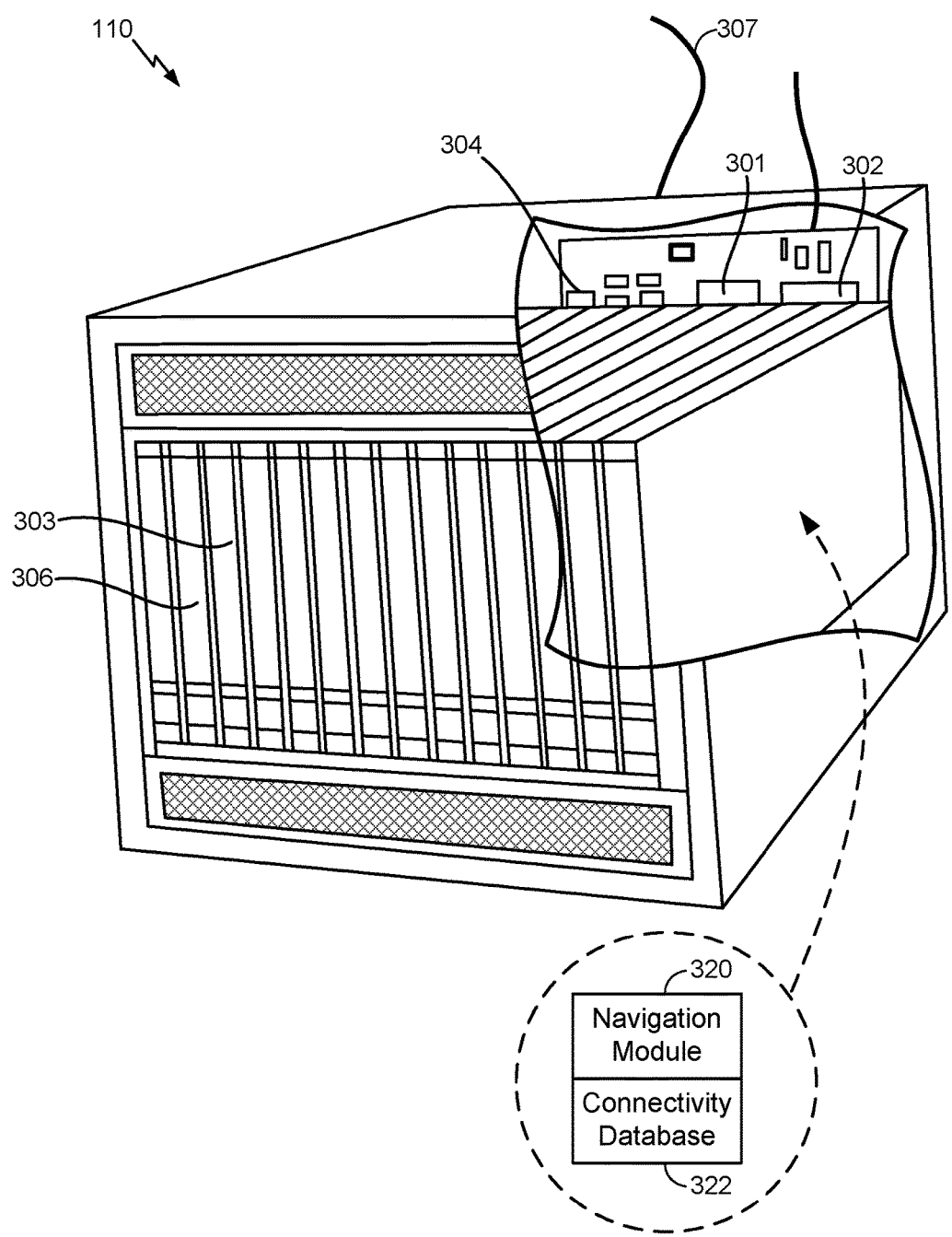
FIG. 3 illustrates an exemplary server according to various aspects of the disclosure.

Various aspects of the disclosure may be implemented on any of a variety of commercially available server devices, such as positioning server 110 illustrated in FIG. 3. In FIG. 3, the positioning server 110 includes a processor 301 coupled to volatile memory 302 and a large capacity nonvolatile memory, such as a disk drive 303. The positioning server 110 may also include a floppy disc drive, compact disc (CD) or digital video disc (DVD) disc drive 306 coupled to the processor 301. The positioning server 110 may also include network access ports 304 coupled to the processor 301 for establishing data connections with a network 307, such as a local area network coupled to other broadcast system computers and servers or to the Internet. In an aspect, the positioning server 110 may further include a navigation module 320 that may assist a mobile device, such as mobile device 108, in performing navigation operations as described herein. For example, the navigation module 320 may determine one or more paths from an origin to a destination based on information received from the mobile device 108. In an aspect, the navigation module 320 may be stored in the memory of the positioning server 110 and executed by the processor 301.

As noted above, certain mobile devices (e.g., mobile device 108) include applications for navigation, driving directions, and/or pathfinding. Navigation applications, which may be embodied in the navigation module 220 of the mobile device 108, are gaining greater and greater popularity. These applications may use SPS or other techniques to determine the position of the mobile device 108, as described above with reference to FIG. 1. Based on the position of the mobile device 108, a navigation application can determine or obtain directions and other route information for driving, walking, biking, or the like from an origin location (often the current location of the mobile device 108) to a destination location (often entered or selected by a user of the mobile device 108). Many conventional navigation applications show multiple possible routes from the origin to the destination based on the shortest distance or the shortest travel time, which may be calculated based on the distance, available roads between the origin and destination, traffic conditions, speed limits, and the like. In an aspect, such information may be obtained from the positioning server 110 over the network 112 and the navigation module 220 may calculate the possible routes. Alternatively, the navigation module 320 of the positioning server 110 may calculate the possible routes and provide them to the navigation module 220 of the mobile device 108.

Figure 4:
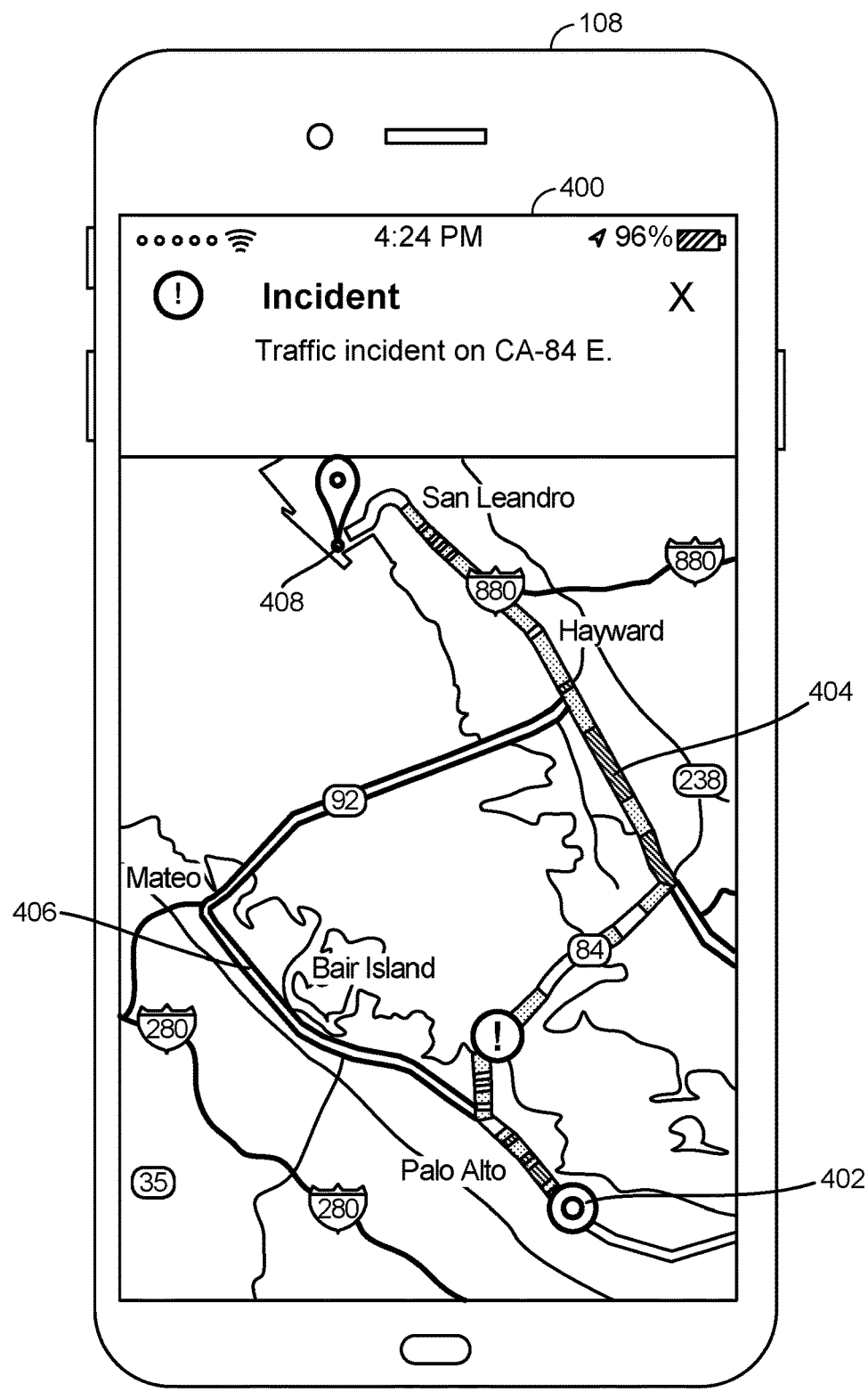
FIG. 4 illustrates an exemplary interface of a navigation application displaying routes from an origin location to a destination location.

FIG. 4 illustrates an exemplary interface 400 of a navigation application, such as navigation module 220, displaying routes from an origin location 402 to a destination location 408. In the example of FIG. 4, two routes, a preferred route 404 and a secondary route 406, are shown on the interface 400. Among the multiple routes 404 and 406, the preferred route 404, which has the shortest time to the destination location 408, is highlighted, while the secondary route 406 is grayed out. In the preferred route 404, different portions of the route 404 are colored to indicate the traffic conditions along that portion of the route, and thereby provide an approximate time to traverse that portion of the route 404. Often, fast, low traffic patches are shown in blue or green, lightly loaded patches are shown in orange, and heavily congested patches are shown in red or black.

In some cases, a user may wish to find a route to a destination that will provide the best WWAN and/or Internet connectivity along the route, rather than being limited to a route with the shortest distance or the shortest travel time regardless of WWAN and/or Internet connectivity. For example, on a long road trip (e.g., from Los Angeles, Calif. to New York City, N.Y.), the user may want to plan the trip such that overnight stops along the way are in locations that meet the user's connectivity requirements.

Having WWAN connectivity (preferable for voice calls) and/or Internet connectivity (preferable for data usage) along a route would be beneficial on shorter trips as well. For example, the user may need to make a call during his or her morning commute, and therefore, the user may wish to select a route that maximizes the WWAN connectivity of the mobile device 108 from his or her home to place of work. As another example, even if the driver of the vehicle is not able to take advantage of the data usage provided by Internet connectivity, any passengers in the vehicle may be able to utilize the Internet connectivity during a trip. As another example, with the advent of self-driving vehicles, a user could be working in the vehicle during the trip and may therefore be more interested in maintaining WWAN and/or Internet connectivity along the route.

Accordingly, the present application provides a navigation application, embodied in the navigation module 220, that determines one or more routes from an origin to a destination based on the available WWAN and/or Internet connectivity along the route(s). In an aspect, the navigation module 220 can determine one or more routes that maximize WWAN connectivity, Internet connectivity, or both. The available route(s) can be ranked in the order of the availability of WWAN connectivity, Internet connectivity, or both along the route, with routes having better connectivity having a higher rank.

In an aspect, the navigation module 220 may determine whether the one or more routes should maximize WWAN connectivity, Internet connectivity, or both based on input from the user or information about the user's plans during the trip stored on or accessible to the mobile device 108. For example, the navigation module 220 may prompt the user to select a preferred type of connectivity (e.g., WWAN connectivity, Internet connectivity, or both) for the trip, or the navigation module 220 may ask the user to select the type of usage he or she is most likely to engage in on the trip, such as voice, data, or both. As another example, the navigation module 220 may access the user's calendar to determine whether or not the user has any calls scheduled during the trip.

In an aspect, the navigation module 320 may determine one or more routes meeting the connectivity needs of the user by sending the origin, the destination, the connectivity type to maximize (e.g., WWAN connectivity, Internet connectivity, or both), and the mode of travel (e.g., vehicle, bicycle, foot, or the like) to the positioning server 110. The navigation module 320 may calculate one or more possible routes from the origin to the destination based on connectivity information for the roads or pathways (e.g., bike paths, walking paths, or the like) between the origin and the destination retrieved from the connectivity database 322. The navigation module 320 may also consider traffic conditions, speed limits, or the like, as applicable, when calculating possible routes between the origin and destination in order to choose the shortest or fastest route that maximizes the selected connectivity type.

In another aspect, the navigation module 220 may calculate the one or more possible routes itself based on information obtained from the navigation module 320 and the connectivity database 322. For example, the navigation module 220 may obtain, from the navigation module 320 for example, a map of roads or other pathways (e.g., bike paths, walking paths, or the like) between the origin and the destination and/or traffic conditions, speed limits, or the like, as applicable, along the roads or pathways between the origin and the destination, and, from the connectivity database 322, connectivity information for the roads or pathways between the origin and the destination.

In an aspect, the WWAN and/or Internet connectivity information for a route may be obtained in different ways. For example, where the navigation module 220 calculates the possible routes from the origin to the destination, when the user enters the destination into the navigation module 220, the navigation module 220 can send the possible routes to the base station currently serving the mobile device 108. The base station can then check its backhaul to the core network to obtain the type of connectivity (e.g., WWAN connectivity, Internet connectivity, or both) available and the load and the network conditions of the cells/base stations (e.g., WAN-WAPs 104) along the possible routes to the destination. Alternatively, the navigation module 220 may send only the destination to the core network, and the navigation module 320 may determine one or more possible routes to the destination based on the type of connectivity available and the load and the network conditions of the cells/base stations along the possible routes to the destination.

More specifically, each network provider typically maintains multiple servers, such as positioning server 110. Each server would store information about multiple base stations (e.g., WAN-WAPs 104) within a geographical area. All the servers belonging to a given network provider can in turn share data with each other if and as needed. Each base station periodically monitors the network load it is under and uploads the status of its load and available data speed to its respective server. Whenever a route selection needs to be performed, the navigation module 220 would make the request to the serving cell/base station of the mobile device 108 (e.g., by sending the destination or the one or more possible routes). The mobile device 108's serving cell queries its associated server with the destination information or the one or more possible routes. Based on the destination information or the one or more possible routes, the navigation module 320 of the serving base station's server queries the server(s) that have the data from the base stations along the possible routes to the destination. Based on this information, one or more routes satisfying the user's connectivity preferences can be generated. Where the navigation module 220 determines one or more routes to the destination, the one or more routes satisfying the user's connectivity preferences may be a subset of the one or more routes determined by the navigation module 220.

For example, one or more base stations along a possible route may not provide Internet connectivity, so if that is the preferred type of connectivity, the navigation module 220/320 can choose a different route that bypasses those base stations. As another example, one or more base stations along a possible route may provide Internet connectivity, but may be operating at or near maximum capacity. As such, the navigation module 220/320 can choose a different route that bypasses those base stations. As yet another example, if there are no base stations providing WWAN connectivity for a portion of a possible route, the navigation module 220/320 can choose a different route that goes around the portion of the route without WWAN connectivity. Based on this information, the route(s) provided to the user may not only include the minimum time and/or distance to the destination, but also the availability of the preferred type of connectivity along the route(s).

In another aspect, crowdsourcing information from the positioning server 110 (e.g., connectivity database 322) can be used to obtain WWAN and Internet connectivity information for the possible routes from the origin to the destination. In this case, each mobile device 108 having the navigation module 220 can provide information to the positioning server 110 regarding its WWAN and Internet connectivity along a particular route. In an aspect, the connectivity information may be tracked automatically by the navigation module 220 or, at the end of a trip, the navigation module 220 can ask the user for feedback regarding the connectivity during the trip. The navigation module 220 can then report the connectivity information for the route to the positioning server 110 at the end of the trip, and the positioning server 110 may store the connectivity information in the connectivity database 322. With enough mobile devices 108 providing this feedback to the positioning server 110, the positioning server 110 can build a very accurate database of WWAN and Internet connectivity (e.g., connectivity database 322).

In general, different mobile devices 108 may support different bands for a particular radio access technology (RAT) (e.g., 3G, LTE, etc.), where the mobile device 108 will support various "home" network bands and certain other bands that provide "roaming" coverage. For example, in a scenario where the mobile device 108 is roaming, the WWAN and/or Internet connectivity determined for a particular route can also include whether the band(s) supported by the network operator is/are also supported by the mobile device 108. This will ensure that the best possible route to satisfy the user's WWAN and/or Internet connectivity preferences will be chosen. Without this feature, it is possible that a route would have good WWAN and/or Internet connectivity for a particular operator (e.g., AT&T, Verizon, etc.) but the mobile device 108 will not be able to support the particular band, which could lead to an inferior route being chosen.

In another aspect, if the mobile device 108 is a dual subscription device, such as a dual Subscriber Identity Module (SIM) device, the WWAN and/or Internet connectivity for the possible routes may be determined for each subscription. For example, some portions of a route may have good WWAN and/or Internet connectivity for one subscription and poor WWAN and/or Internet connectivity for the other subscription, and vice versa. The mobile device 108 (e.g., the navigation module 220) can therefore determine the best route(s) based on the connectivity provided by both subscriptions, rather than a single subscription, and can select which subscription to utilize for a portion of the route based on which subscription has better coverage in that portion of the route.

In an aspect, where one or more of the subscriptions are subject to usage (e.g., megabytes of data, talk minutes, text messages, etc.) limits, the navigation module 220 can look up each subscriptions' remaining usage, and if there is a subscription within a given threshold of being exhausted, the navigation module 220 can select a route that minimizes, or eliminates, the amount that that subscription would be used.

Figure 5:
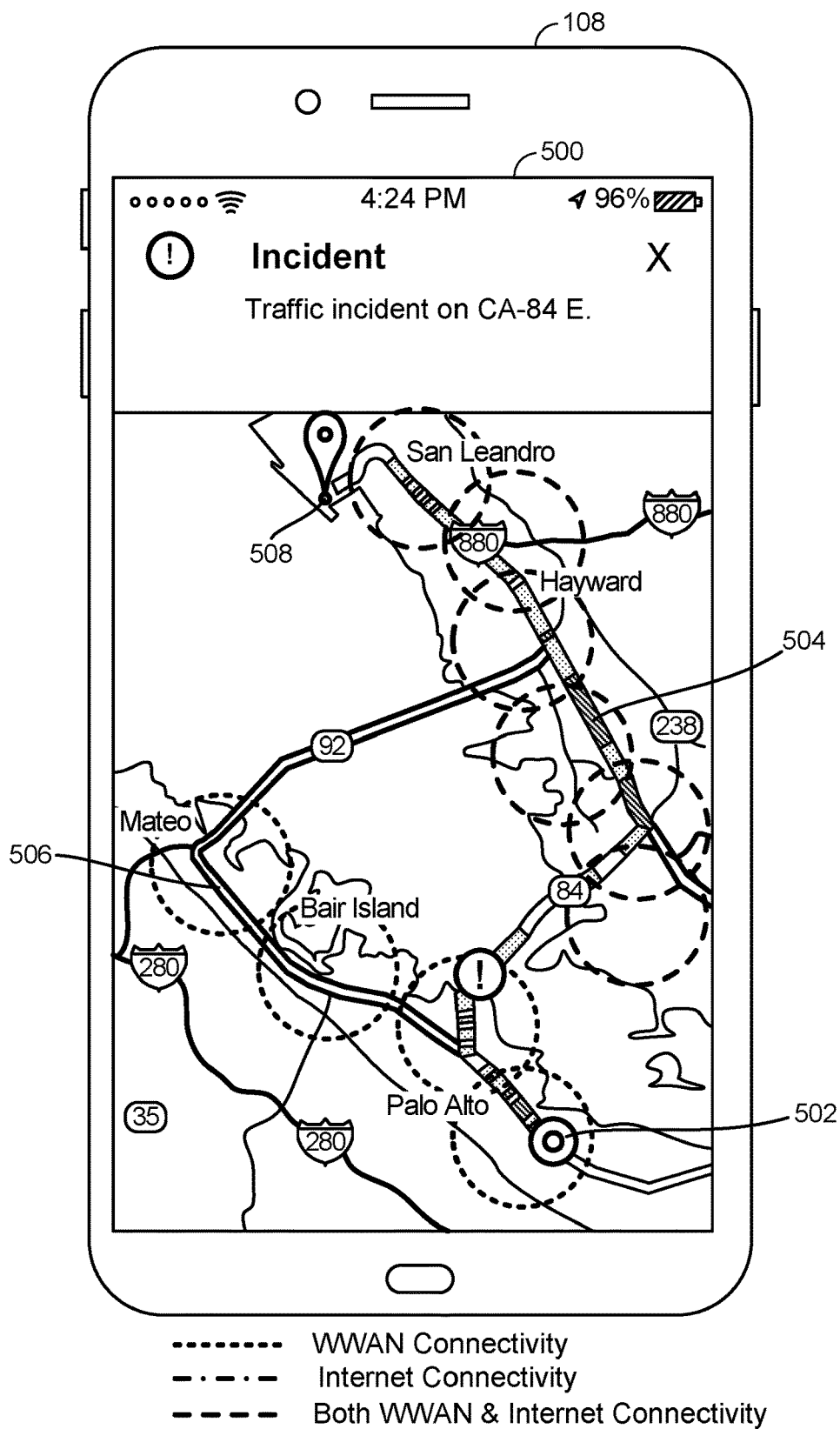
FIG. 5 illustrates an exemplary interface of a navigation application displaying routes from an origin location to a destination location.

Once the navigation module 220 determines one or more routes that satisfy the connectivity preferences of the user (and optionally the time or distance preferences of the user), the navigation module 220 can display the one or more routes to the user. The user can then select the preferred route. FIG. 5 illustrates an exemplary interface 500 of a navigation application, such as navigation module 220, displaying routes from an origin location 502 to a destination location 508. The origin location 502 and the destination location 508 may correspond to the origin location 402 and the destination location 408 in FIG. 4. As in the example of FIG. 4, in FIG. 5, two routes, a preferred route 504 and a secondary route 506, are shown on the interface 500. As shown in FIG. 5, the connectivity along the preferred route 504 includes only WWAN connectivity for a first portion of the preferred route 504 and both WWAN and Internet connectivity for the remainder of the preferred route 504. A portion of the preferred route 504 corresponding to a bridge has no connectivity. In contrast, the connectivity along the secondary route 506 includes only WWAN connectivity, with intermittent areas with no connectivity. As such, the preferred route 504 is preferred because it provides better connectivity to the user.

Note that although in the example of FIG. 5, the preferred route 504 and the secondary route 506 correspond to the preferred route 404 and the secondary route 406, as will be appreciated, this is merely coincidental and the fastest or shortest route may not always be the route with the best connectivity. Also, although the type of connectivity along the routes 504 and 506 is illustrated by circles, other indicators may be used. For example, the type of connectivity along a portion of a route may be illustrated by color codes, similar to how traffic conditions are indicated. For example, portions of the route having WWAN and Internet connectivity may be displayed in a first color, portions of the route having only WWAN connectivity may be displayed in a second color, portions of the route having only Internet connectivity may be displayed in a third color, and portions of the route having no connectivity or limited connectivity may be displayed in a fourth color.

As an example implementation, consider a case where a user is streaming a video and wishes to watch it on the way to a given destination. In this case, the user may not only be interested in following a route with the shortest time to the destination, but might actually prefer a somewhat longer route that has better Internet connectivity (and therefore data connectivity) so that he or she can continue to watch the video without interruption due to loss of connectivity. The example is even more applicable when the user is not actually driving, as in the case of a self-driving vehicle.

As another example implementation, consider a case where a user is on a call and expects it to be a long voice conversation. In such a case, the user might prefer a route that will offer seamless WWAN connectivity (and therefore voice connectivity) with no interruption, rather than just the shortest route to the destination. Alternatively, in a case where the user is expecting an important call while traveling, the user may prefer to take the route with the best and most seamless WWAN connectivity to minimize the possibility of missing the call.

As yet another example implementation, a user may leave the office at 6:00 pm and wish to attend a 6:30 pm meeting on the way home. In such a scenario, the user may prefer to find a route with better WWAN connectivity, rather than simply taking his or her normal route home based on the traffic conditions.

Figure 6:
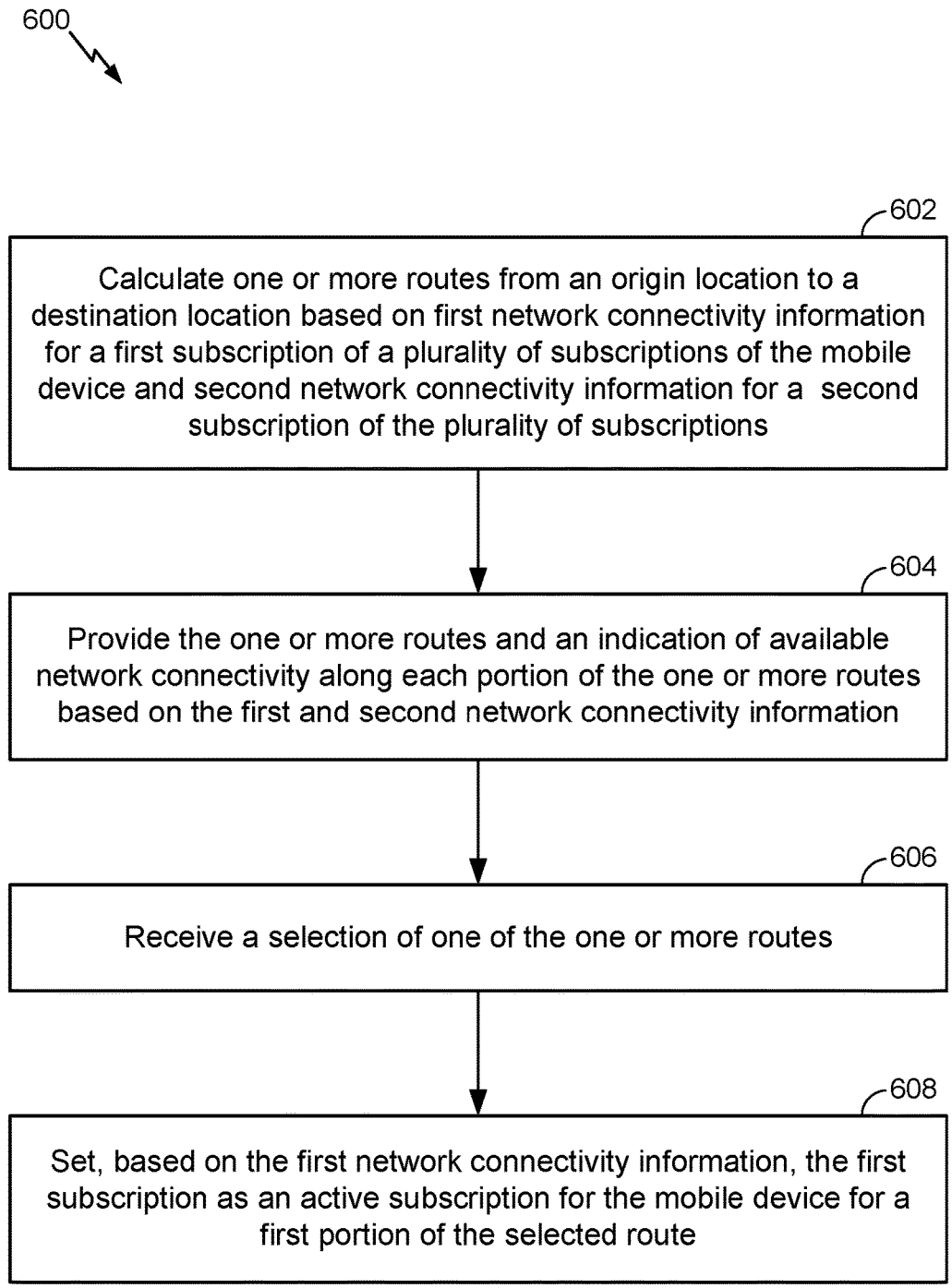
FIG. 6 illustrates an exemplary flow for navigating a mobile device based on network connectivity.

FIG. 6 illustrates an exemplary flow 600 for navigating a mobile device (e.g., mobile device 108) based on network connectivity. The flow 600 may be performed by the mobile device (e.g., mobile device 108, specifically, processor 210 in conjunction with navigation module 220) or a positioning server (e.g., positioning server 110, specifically, processor 301 in conjunction with navigation module 320).

At 602, the flow 600 includes calculating one or more routes from an origin location to a destination location based on first network connectivity information for a first subscription of a plurality of subscriptions of the mobile device and second network connectivity information for a second subscription of the plurality of subscriptions. In an aspect, the first and second network connectivity information may be based on previous network connectivity information received at a positioning server from a plurality of mobile devices traveling the one or more routes (e.g., based on crowdsourced connectivity information, as discussed above). In another aspect, the first and second network connectivity information may be based on current network connectivity information determined by a core network for a plurality of base stations along the one or more routes (e.g., network assisted). In an aspect, the first and second network connectivity information may include signal strength parameters, network type, current number of users, data intensiveness of current users, data rate available, or any combination thereof.

In an aspect, the first and second network connectivity information may be for a given type of network connectivity, and the available network connectivity may be the given type of network connectivity. The given type of network connectivity may be one of cellular connectivity, data connectivity, or both cellular and data connectivity. In an aspect, the given type of network connectivity may be based on connectivity preferences of a user of the mobile device. In an aspect, the connectivity preferences of the user of the mobile device may be based on appointment information retrieved from a calendar of the user of the mobile device, or user input specifying the connectivity preferences of the user.

In an aspect, calculating the one or more routes at 602 may be further based on identifying a subscription of the first subscription and the second subscription that has a lower amount of data usage remaining and calculating the one or more routes to reduce usage of the identified subscription.

At 604, the flow 600 includes providing the one or more routes and an indication of available network connectivity along each portion of the one or more routes based on the first and second network connectivity information. In an aspect, the indication of available network connectivity along each portion of the one or more routes may be an indication of combined network connectivity for the plurality of subscriptions.

In an aspect, where the flow 600 is performed by a mobile device, the providing at 604 may include displaying the one or more routes and the indication of the available network connectivity on a user interface (e.g., display 256) of the mobile device. In an aspect, where the flow 600 is performed by a positioning server, the providing at 604 may include sending the one or more routes and the indication of the available network connectivity to the mobile device to be displayed on a user interface (e.g., display 256) of the mobile device.

At 606, the flow 600 includes receiving a selection of one of the one or more routes. In an aspect, where the flow 600 is performed by a mobile device, the selection may be received from a user. In an aspect, where the flow 600 is performed by a positioning server, the selection may be received from the mobile device, and the selection may have been received at the mobile device from the user.

At 608, the flow 600 includes setting, based on the first network connectivity information, the first subscription as an active subscription for the mobile device for a first portion of the selected route.

Although not illustrated in FIG. 6, the flow 600 may further include switching, based on the second network connectivity information, to the second subscription of the plurality of subscriptions as the active subscription for the mobile device for a second portion of the selected route. In an aspect, the switching may be based on the second subscription having better network connectivity than the first subscription for the second portion of the route.

Figure 7:
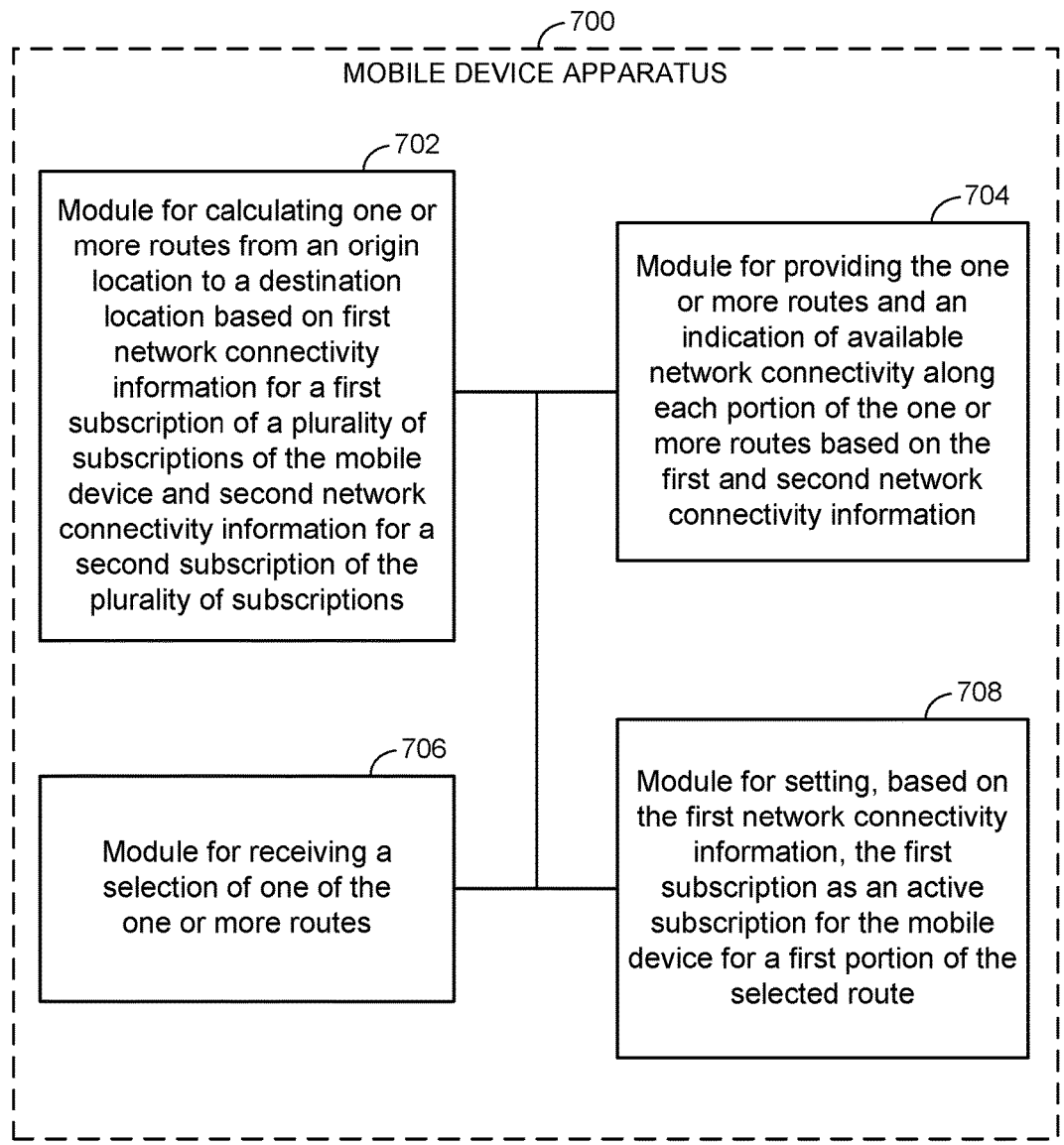
FIGS. 7-8 are simplified block diagrams of several sample aspects of apparatuses configured to support navigation operations as taught herein.

FIG. 7 illustrates an example mobile device apparatus 700 represented as a series of interrelated functional modules. A module for calculating 702 may correspond at least in some aspects to, for example, a processing system, such as processor 210 in conjunction with navigation module 220, as discussed herein. A module for providing 704 may correspond at least in some aspects to, for example, a processing system in conjunction with an output device, such as processor 210 in conjunction with navigation module 220 and display 256, as discussed herein. A module for receiving 706 may correspond at least in some aspects to, for example, a processing system in conjunction with an input device, such as processor 210 in conjunction with navigation module 220 and display 256, as discussed herein. A module for setting 708 may correspond at least in some aspects to, for example, a processing system, such as processor 210 in conjunction with navigation module 220, as discussed herein.

Figure 8:
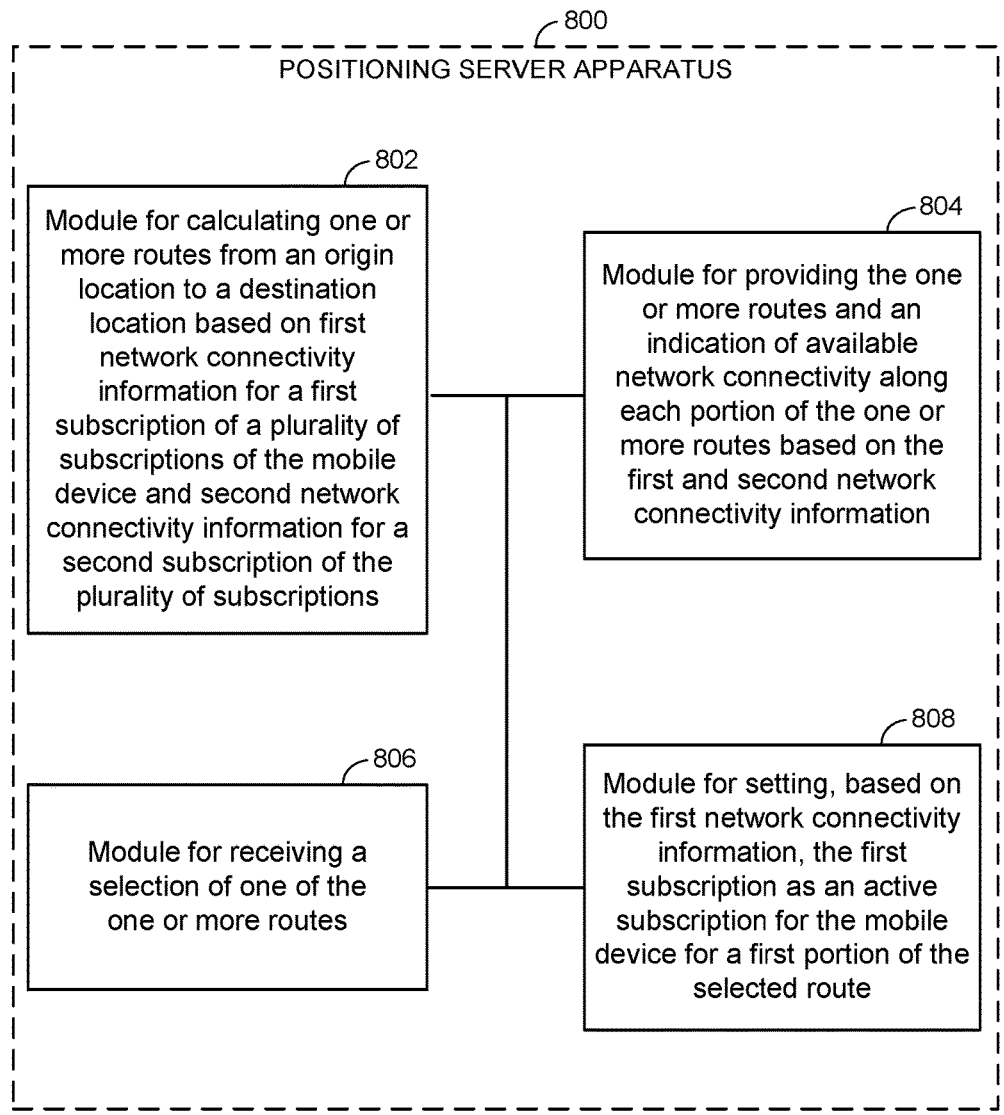

FIG. 8 illustrates an example positioning server apparatus 800 represented as a series of interrelated functional modules. A module for calculating 802 may correspond at least in some aspects to, for example, a processing system, such as processor 301 in conjunction with navigation module 320, as discussed herein. A module for providing 804 may correspond at least in some aspects to, for example, a processing system in conjunction with a communication device, such as processor 301 in conjunction with navigation module 320 and network access ports 304, as discussed herein. A module for receiving 806 may correspond at least in some aspects to, for example, a processing system in conjunction with a communication device, such as processor 301 in conjunction with navigation module 320 and network access ports 304, as discussed herein. A module for setting 808 may correspond at least in some aspects to, for example, a processing system, such as processor 301 in conjunction with navigation module 320, as discussed herein.

The functionality of the modules of FIGS. 7-8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 7-8, as well as other components and functions described herein, may be implemented using any suitable means. Such means also may be implemented, at least in part, using corresponding structure as taught herein. For example, the components described above in conjunction with the "module for" components of FIGS. 7-8 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile device, such as mobile device 108. In the alternative, the processor and the storage medium may reside as discrete components in the mobile device.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disk (CD), laser disc, optical disc, digital video disk (DVD), floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for navigating a mobile device based on network connectivity, comprising:
    calculating one or more routes from an origin location to a destination location based on first network connectivity information for a first subscription of a plurality of subscriptions of the mobile device and second network connectivity information for a second subscription of the plurality of subscriptions;
    providing the one or more routes and an indication of available network connectivity along each portion of the one or more routes based on the first and second network connectivity information;
receiving a selection of one of the one or more routes; and
setting, based on the first network connectivity information, the first subscription as an active subscription for the mobile device for a first portion of the selected route.

2. The method of claim 1, wherein the first and second network connectivity information is based on previous network connectivity information received at a positioning server from a plurality of mobile devices traveling the one or more routes.

3. The method of claim 1, wherein the first and second network connectivity information is based on current network connectivity information determined at a core network for a plurality of base stations along the one or more routes.

4. The method of claim 1, wherein the first and second network connectivity information comprises signal strength parameters, network type, current number of users, data intensiveness of current users, data rate available, or any combination thereof.

5. The method of claim 1, wherein the indication of available network connectivity along each portion of the one or more routes is an indication of combined network connectivity for the plurality of subscriptions.

6. The method of claim 1, further comprising:
switching, based on the second network connectivity information, to the second subscription of the plurality of subscriptions as the active subscription for the mobile device for a second portion of the selected route.

7. The method of claim 6, wherein the switching is based on the second subscription having better network connectivity than the first subscription for the second portion of the selected route.

8. The method of claim 1, wherein the first and second network connectivity information are for a given type of network connectivity, and wherein the available network connectivity is the given type of network connectivity.

9. The method of claim 8, wherein the given type of network connectivity is one of cellular connectivity, data connectivity, or both cellular and data connectivity.

10. The method of claim 8, wherein the given type of network connectivity is based on connectivity preferences of a user of the mobile device.

11. The method of claim 10, wherein the connectivity preferences of the user of the mobile device are based on appointment information retrieved from a calendar of the user of the mobile device, or user input specifying the connectivity preferences of the user.

12. The method of claim 1, wherein calculating the one or more routes is further based on identifying a subscription of the first subscription and the second subscription that has a lower amount of data usage remaining and calculating the one or more routes to reduce usage of the identified subscription.

13. The method of claim 1, wherein the method is performed by the mobile device.

14. The method of claim 13, wherein the providing comprises displaying the one or more routes and the indication of the available network connectivity.

15. The method of claim 1, wherein the method is performed by a positioning server.

16. The method of claim 15, wherein the providing comprises sending the one or more routes and the indication of the available network connectivity to the mobile device.

17. An apparatus for navigating a mobile device based on network connectivity, comprising:
at least one processor configured to:
calculate one or more routes from an origin location to a destination location based on first network connectivity information for a first subscription of a plurality of subscriptions of the mobile device and second network connectivity information for a second subscription of the plurality of subscriptions;
provide the one or more routes and an indication of available network connectivity along each portion of the one or more routes based on the first and second network connectivity information;
receive a selection of one of the one or more routes; and
set, based on the first network connectivity information, the first subscription as an active subscription for the mobile device for a first portion of the selected route.

18. The apparatus of claim 17, wherein the first and second network connectivity information is based on previous network connectivity information received at a positioning server from a plurality of mobile devices traveling the one or more routes.

19. The apparatus of claim 17, wherein the first and second network connectivity information is based on current network connectivity information determined at a core network for a plurality of base stations along the one or more routes.

20. The apparatus of claim 17, wherein the first and second network connectivity information comprises signal strength parameters, network type, current number of users, data intensiveness of current users, data rate available, or any combination thereof.

21. The apparatus of claim 17, wherein the indication of available network connectivity along each portion of the one or more routes is an indication of combined network connectivity for the plurality of subscriptions.

22. The apparatus of claim 17, wherein the at least one processor is further configured to:
switch, based on the second network connectivity information, to the second subscription of the plurality of subscriptions as the active subscription for the mobile device for a second portion of the selected route.

23. The apparatus of claim 22, wherein the at least one processor is configured to switch to the second subscription based on the second subscription having better network connectivity than the first subscription for the second portion of the selected route.

24. The apparatus of claim 17, wherein the first and second network connectivity information are for a given type of network connectivity, and wherein the available network connectivity is the given type of network connectivity.

25. The apparatus of claim 24, wherein the given type of network connectivity is one of cellular connectivity, data connectivity, or both cellular and data connectivity.

26. The apparatus of claim 24, wherein the given type of network connectivity is based on connectivity preferences of a user of the mobile device.

27. The apparatus of claim 17, wherein the apparatus is the mobile device, and wherein the at least one processor being configured to provide comprises the at least one processor being configured to cause a user interface of the mobile device to display the one or more routes and the indication of the available network connectivity.

28. The apparatus of claim 17, wherein the apparatus is a positioning server, and wherein the at least one processor being configured to provide comprises the at least one processor being configured to cause a communication device of the positioning server to send the one or more routes and the indication of the available network connectivity to the mobile device.

29. An apparatus for navigating a mobile device based on network connectivity, comprising:
a processing means configured to:
calculate one or more routes from an origin location to a destination location based on first network connectivity information for a first subscription of a plurality of subscriptions of the mobile device and second network connectivity information for a second subscription of the plurality of subscriptions;
provide the one or more routes and an indication of available network connectivity along each portion of the one or more routes based on the first and second network connectivity information;
receive a selection of one of the one or more routes; and
set, based on the first network connectivity information, the first subscription as an active subscription for the mobile device for a first portion of the selected route.

30. A non-transitory computer-readable medium storing computer-executable instructions for navigating a mobile device based on network connectivity, the computer-executable instructions comprising:
at least one instruction to calculate one or more routes from an origin location to a destination location based on first network connectivity information for a first subscription of a plurality of subscriptions of the mobile device and second network connectivity information for a second subscription of the plurality of subscriptions;
at least one instruction to provide the one or more routes and an indication of available network connectivity along each portion of the one or more routes based on the first and second network connectivity information;
at least one instruction to receive a selection of one of the one or more routes; and
at least one instruction to set, based on the first network connectivity information, the first subscription as an active subscription for the mobile device for a first portion of the selected route.

* * * * *